United States Patent [19]

Berk

[11] Patent Number: 4,688,039

[45] Date of Patent: Aug. 18, 1987

[54] HEAT-INSULATED TELEMETRY SYSTEM FOR VACUUM FURNACE

[75] Inventor: Michael A. Berk, Havertown, Pa.

[73] Assignee: Abar Ipsen Industries, Feasterville, Pa.

[21] Appl. No.: 788,238

[22] Filed: Oct. 17, 1985

[51] Int. Cl.$^4$ .............................................. G08C 19/12
[52] U.S. Cl. ......................... 340/870.17; 340/870.03; 374/179; 266/89
[58] Field of Search ...................... 340/870.17, 870.03; 361/380; 174/52 R; 374/139, 140, 179; 136/230; 329/201; 266/87, 89, 110, 250

[56] References Cited

U.S. PATENT DOCUMENTS

| | | | |
|---|---|---|---|
| 3,260,116 | 7/1966 | Grady | 340/870.17 |
| 3,582,921 | 6/1971 | Krieger | 340/870.17 |
| 4,281,985 | 8/1981 | Mee et al. | 374/179 |
| 4,384,289 | 5/1983 | Stillwell et al. | 340/870.17 |

OTHER PUBLICATIONS

"Meas. of Water Temp. in a Rotating Evaporation System" by E. J. Brainard et al., *IBM Tech. Discl. Bull.*, vol. 12, No. 13.

*Primary Examiner*—John W. Caldwell, Sr.
*Assistant Examiner*—Tyrone Queen
*Attorney, Agent, or Firm*—Paul & Paul

[57] ABSTRACT

A heat-insulating box houses a telemetry system of high accuracy for use within a high-temperature vacuum furnace. The container includes an inner box formed by a block of rigid heat-insulating material having a cavity which contains a telemetry system chassis and its components, including such items as batteries, transmitters, switches, thermocouple elements including transition tubes, isothermal double-layer terminal strips, and the like. A plurality of very fine thermocouple conductors of dissimilar metal extend from the thermocouple junction tips on work pieces outside of the box through the heat-insulating inner block to the thermocouple transition tubes, and then, by way of the isothermal double-layer terminal strip to the transmitters. An antenna lead is carried through the wall of the box to a transmitting antenna mounted on the front wall of the box. Pressure switches in the cavity within the box control the ON-OFF condition of the transmitters. These pressure switches are normally open and do not close until the pressure falls to a vacuum pressure corresponding to the pressure in the vacuum furnace, and the switches open when the pressure rises to a preselected value. Thus, the transmitters are ON for only a portion of a complete work cycle. Battery energy is conserved and battery life extended. Various features of the construction of the telemetry box and its contents contribute toward insulating the telemetry transmitters from the high heat of the furnace.

16 Claims, 8 Drawing Figures

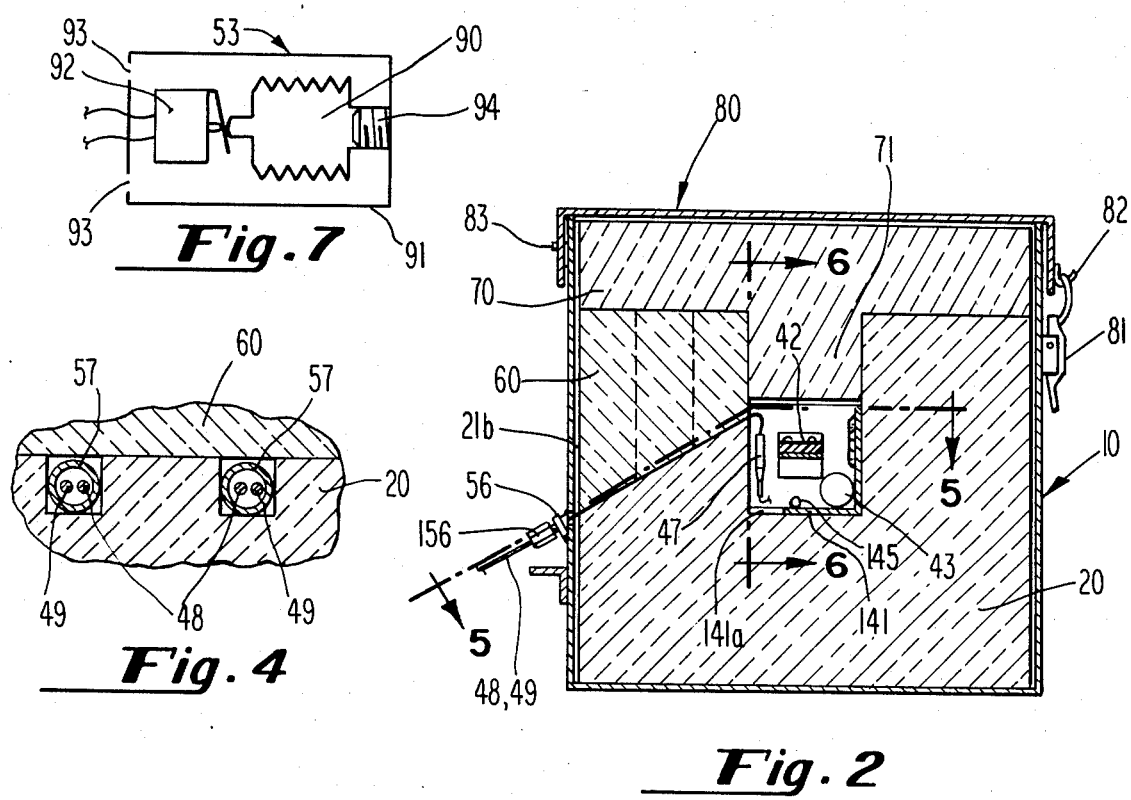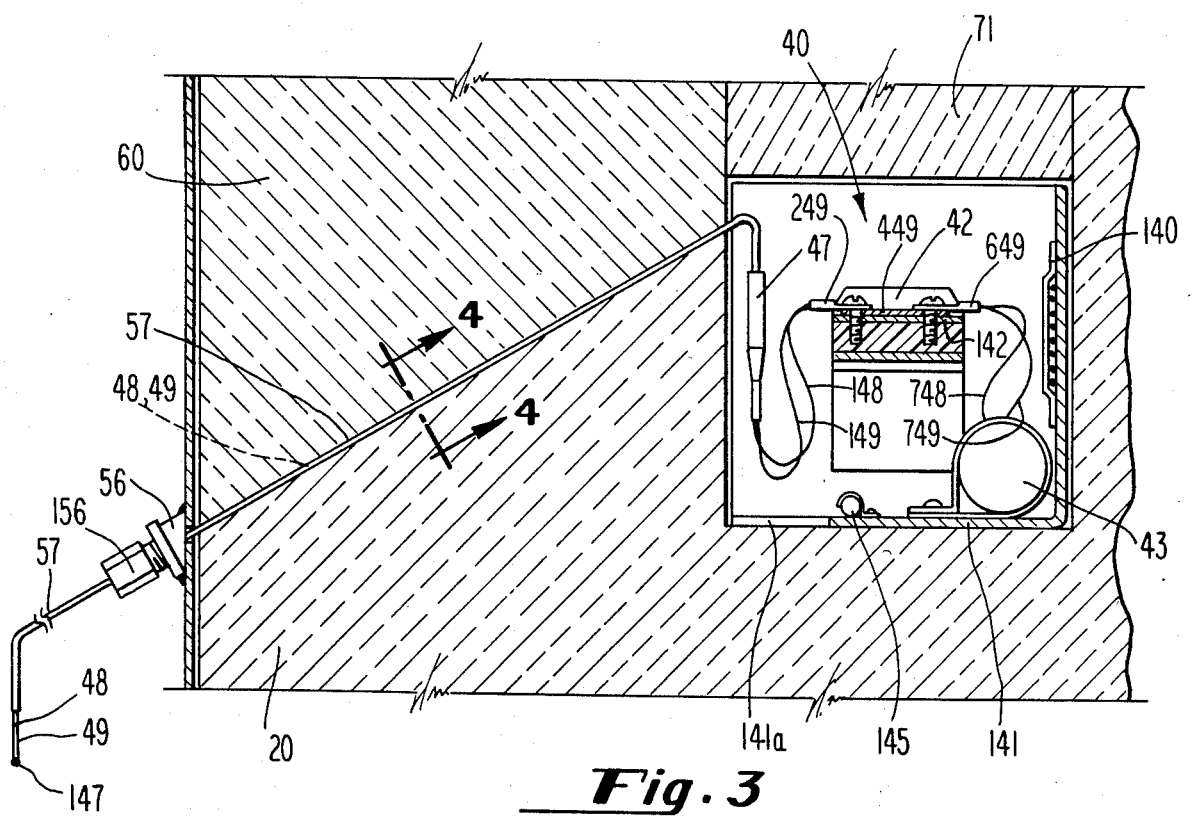

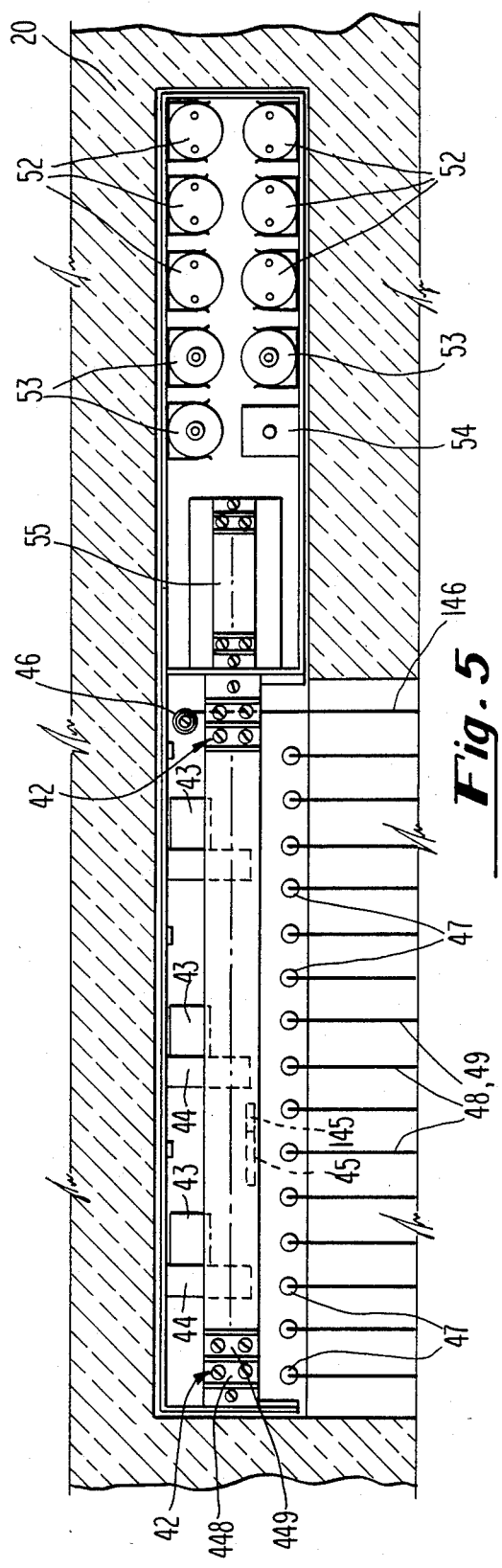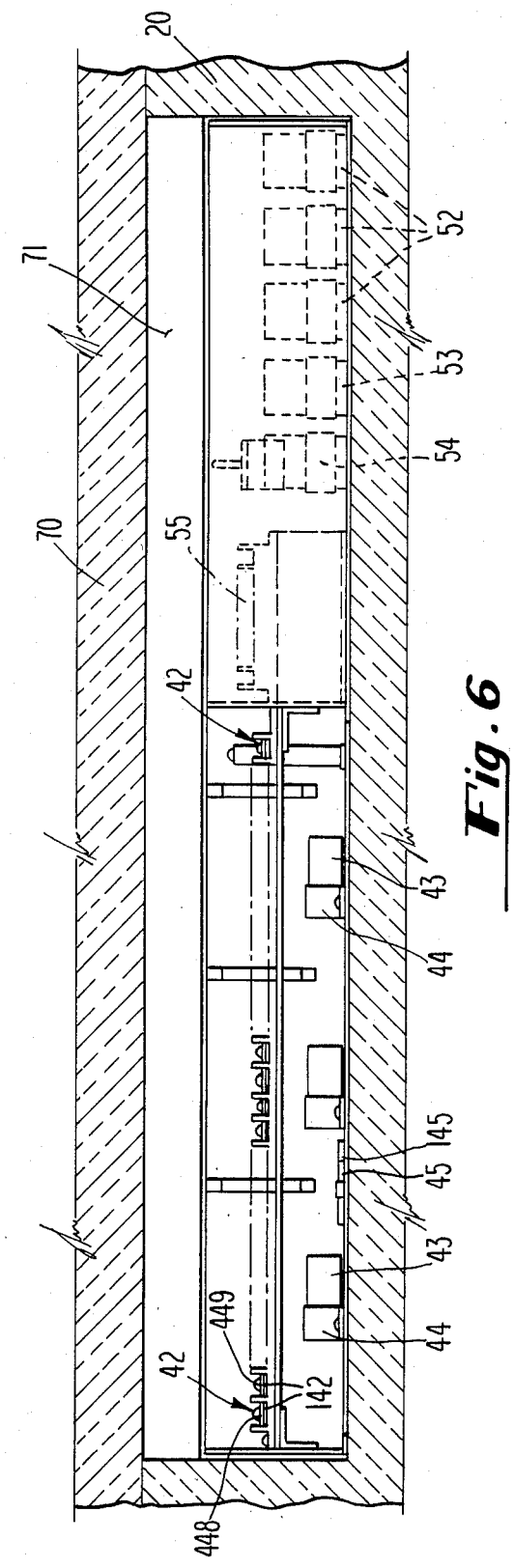

HEAT-INSULATED TELEMETRY SYSTEM FOR VACUUM FURNACE

BACKGROUND OF THE INVENTION

This invention relates in general to high-temperature vacuum furnaces in which, for example, ferrous workpieces may be brazed, or surface hardened, or otherwise treated, under reduced pressure. The reduced pressure may range from sub-atmospheric pressure to high vacuum.

The invention relates particularly to means for sensing the temperatures at the surfaces of a number of workpieces as they are conveyed on a carrier through the vacuum furnace and for transmitting with high accuracy the sensed temperature data to a telemetry receiver located outside the furnace.

A specific application of the invention will be described. However, it is to be understood that the invention has other applications and may be used for other purposes than that which is specifically described. The scope of the invention is, of course, defined in the claims which are appended to this application.

One specific use of the invention which will now be described is in connection with the brazing of small radiators of the type which are used in automobiles for various purposes, such as the heating of the interior of the automobile, cooling of the transmission fluid, and other purposes. These radiators are considerably smaller than the radiator which is used to cool the engine. They are, however, similar in that they comprise a series of tubes which are connected by fins. Connection of the fins to the tubes may be accomplished by brazing, i.e., by subjecting the radiators to high temperature in a vacuum furnace.

In a typical installation, a platform or tray type of carrier is used to carry a quantity of these small radiators through a vacuum furnace on a conveyor mechanism. The same carrier also carries a telemetry box which houses a telemetry system whose function is to detect the temperatures on the surfaces of a number of the radiators, for example, on the surfaces of fifteen radiators spaced apart and randomly selected, and to transmit accurate temperature data to a receiver located outside of the vacuum furnace. The data received is then processed in a computer and, if necessary, adjustments are made by the computer, or manually, to one or more of the heating elements of the vacuum furnace for the purpose of achieving uniform brazing of the radiators.

The telemetry system includes a plurality of thermocouples whose dissimilar metal junctions or tips are positioned on the variously positioned, randomly selected, radiators. The temperature data sensed by the thermocouple tips is carried by the thermocouple conductors into the interior of a heat-insulated box which houses the telemetry chassis. Transmitters within the box mounted on the telemetry chassis transmit signals to a receiving antenna mounted on an interior wall of the vacuum furnace and the received signals are carried through the furnace wall to a receiver outside the furnace and then to a computer which controls the system.

In a typical installation, a vacuum furnace comprises three compartments as follows: (1) a preheat chamber; (2) a braze chamber; and (3) an exit chamber. The carrier, which in the present example carries a quantity of small radiators and also the telemetry box, is conveyed by a conveyor to the entrance door of the preheat chamber. The pressure in the chamber is raised to atmosphere and the door is opened. The carrier is conveyed within the preheat chamber, the entrance door is closed, and the preheat chamber is pumped down to a vacuum pressure while the work is preheated. After a period time, the door separating the preheat chamber from the inward braze chamber is opened and the carrier with its radiators and telemetry box is transported by the conveyor into the braze chamber which is at a higher vacuum. The door between the preheat and braze chambers is then closed, and the workpieces (radiators) are subjected to a temperature profile, one example of which will be described in detail later on in this patent application. After a preselected time period, the door which separates the braze chamber from the exit chamber is opened and the workpieces are transported into the exit chamber. The door between the braze and exit chambers is closed. The pressure in the exit chamber then rises to atmosphere. The exit door is opened and the conveyor then carries the carrier with the workpieces and telemetry box thereon to a cooling chamber where the radiators and the telemetry box are rapidly cooled. The conveyor next carries the carrier to an unloading station where the cooled radiators are removed. The carrier carrying the telemetry box is then conveyed to a loading station where the carrier is reloaded, and the cycle just described is repeated.

As is known, a thermocouple comprises a dissimilar metal junction which is located at the tip and from which extends a pair of very fine dissimilar wires. In at least some of the prior art installations of the type here involved, and described above, the very fine dissimilar wires of the thermocouple conductors are terminated in an electrical plug which is inserted into a socket provided in a wall of the telemetry box. Another pair of dissimilar wires extends from the socket to the transmitters within the telemetry box. The transmitters are powered by batteries mounted on a chassis contained within the telemetry box. In prior art installations of which applicant is aware, these batteries are ON for substantially the entire work cycle described above.

SUMMARY OF THE INVENTION

A principal purpose of the present invention is to provide a telemetry system of high accuracy and reliability in which the temperature profiles developed by thermocouple detectors positioned on the surface of workpieces at different locations within a high-temperature vacuum furnace are transmitted to a receiving station located outside of the furnace.

Another purpose is to provide a telemetry box of improved heat-insulating properties and effectiveness for housing a telemetry chassis and its various components which is to be used to detect temperatures within a high-temperature vacuum furnace.

A more specific purpose is to provide a telemetry box which is so thermally designed that it is capable of maintaining the temperature in the interior of the box substantially constant at an ambient temperature, for example, 70° F. despite the fact that the box is positioned within a vacuum furnace whose temperature may rise to, and be maintained for a period of time at, for example, 1500° F.

Another object is to increase the life of the telemetry-system batteries by providing a unique type of absolute vacuum pressure switch having a self-contained reference port of, for example, −17" of mercury-vacuum, and so designed that it will automatically turn ON the telemetry system when the pressure in the interior of the box falls to a vacuum pressure corresponding to that of the interior of the vacuum furnace through which the telemetry box and the workpieces are being conveyed, and will automatically turn OFF the telemetry system as soon as the telemetry box exits from the vacuum pressure of the furnace, thereby conserving battery power and extending battery life to an important extent.

Another object is to provide a heat-insulating box for a telemetry system which has provision for easy access to the thermocouple terminal strip without circuit disassembly so as to be able to easily replace batteries, or thermocouples, or other components, or so as to calibrate the telemetry system or verify calibration using a thermocouple reference milli-volt generator.

Another object is to avoid terminating the thermocouple fine-wire conductors in an electrical plug, as has been done in prior art installations of which the applicant is aware, since such a plug is exposed to the high heat of the vacuum furnace, and instead to provide means whereby the thermocouple fine-wire conductors are terminated within the heat-insulating box, preferably on a double-layer isothermal terminal block so constructed that the terminal block acts a heat-sink, thereby to provide additional protection so as to isolate the heat-sensitive transmitters from the high temperature of the furnace.

BRIEF DESCRIPTION OF THE DRAWINGS

FIG. 2 is a view in section looking along the line 2—2 of FIG. 1.

FIG. 3 is an enlarged view of a portion of FIG. 2.

FIG. 4 is a view looking in along the line 4—4 of FIG. 3.

FIG. 5 is a view looking down along the line 5—5 of FIG. 2 and includes a top view of the telemetry chassis and components.

FIG. 6 is a view looking in along the line 6—6 of FIG. 2 and includes an elevational view of the telemetry chassis and components.

FIG. 7 is a diagrammatic illustration of a pressure switch used in a preferred embodiment of the present invention.

DETAILED DESCRIPTION OF THE PREFERRED EMBODIMENT

Figure 1:
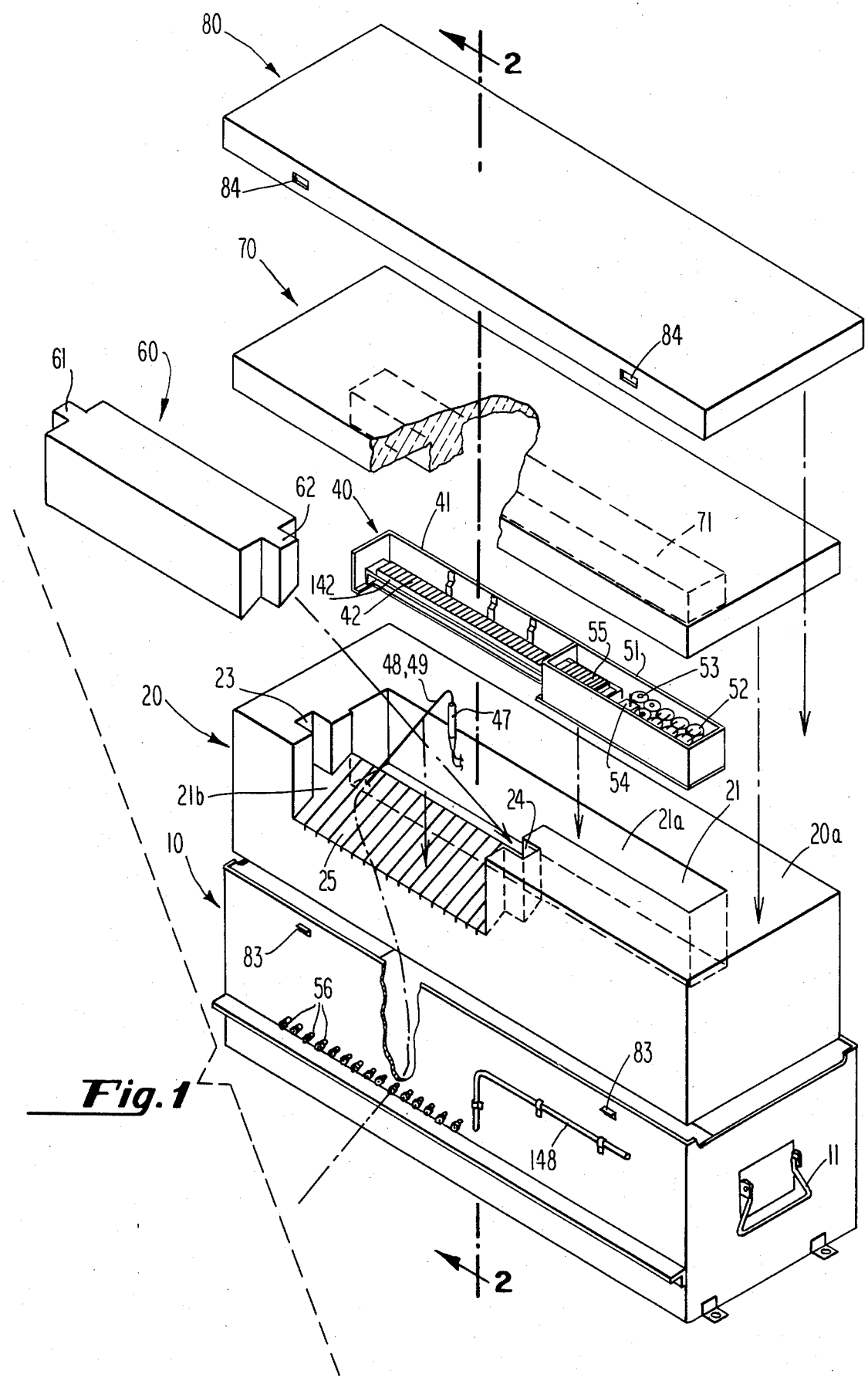
FIG. 1 is an exploded perspective view of a heat-insulating telemetry box according to the present invention for housing a telemetry chassis and components.

FIG. 1 is an exploded view showing an outer metal box 10 which contains a telemetry chassis 40. Box 10 is preferably made of 16-gauge stainless steel. The steel box 10 is preferably rectangular. While it may, of course, have other sizes, a box 10 now being used in a present best mode application of my invention has the following dimensions: 36½ inches long, 12¼ inches wide and 12 inches high.

Fitted within outer metal box 10 is an inner box 20 made of a rectangular block 20a of rigid thermal material having excellent heat-insulating properties and having two cavities adjacent to each other, a primary cavity 21a and a smaller secondary cavity 21b. Block 20a of inner box 20 may preferably be made of Carborundum Fiberfrax Duraboard "HD". Block 20a has a length and width corresponding to that of the interior dimensions of outer metal box 10 so as to fit snugly into outer box 10. The height of block 20a is, however, less than that of outer box 10, leaving within box 10 and above block 20a approximately three inches of space for receiving a rigid top plate 70 which functions as a cover for inner box 20. Top plate 70 is also made of material having high insulating properties, preferably Carborundum Fiberfrax Duraboard "HD".

In block 20a, the primary cavity 21a is centrally located, being elongated and rectangular. It may, for example, have a width of about three inches and a length of about twenty-seven inches, leaving at each end about four-and-one-half inches of the heat-insulating material of block 20a. The depth of the primary cavity is about four-and-one-half inches, so that there are about four-and-one-half inches of heat-insulating material below the flat floor of the primary cavity.

The secondary cavity 21b, which is adjacent approximately one-half of primary cavity 21a, extends laterally all the way to the front wall of the outer box 10. Secondary cavity 21b is generally rectangular having a vertical groove 23, 24 at each of its opposite ends. An insert 60 is slidable vertically into and out of the secondary cavity. Tongues 61, 62 project from the opposite ends of insert 60 and are received into the vertical grooves 23, 24 of the secondary cavity. Thus, insert 60 is slidably insertable vertically into and slidably removable vertically from secondary cavity. Because its vertical movement is like that of a guillotine, insert 60 is sometimes referred to in this application as a guillotine insert. Insert 60 allows for easy replacement of thermocouples. For a reason to be described later, floor 25 of secondary cavity 21b is preferably inclined in a downward direction toward and to the front of outer box 10. The bottom surface of guillotine insert 60 is likewise inclined at an angle corresponding to that of floor 25 of the secondary cavity. The angle of inclination may preferably be in the range of 30°–45°.

The primary cavity 21a is adapted to receive a telemetry chassis 40 and components thereof. Chassis 40 has a width and length corresponding to that of the primary cavity but its height is only about one-half of the depth of the primary cavity.

Assume that guillotine insert 60 has been inserted into place in secondary cavity 21b, and that top plate or cover 70 has been placed in position. Integral with a center strip portion of the underside of the cover 70, and depending therefrom, is an elongated rectangular bat 71 which fits into the upper half portion of primary cavity 21a above chassis 40. This is clearly seen in FIG. 2. Cover 70 and its depending bar 71 are formed of material having good heat-insulating properties, preferably Carborundum Fiberfrax Duraboard "HD".

After cover 70 has been placed in the position illustrated in FIG. 2, hook-receiving openings 84 (visable in FIG. 1) of a stainless steel lid 80 for outside box 10 are hooked onto hooks 83 and the cover 80 is then lowered pivotally into the closed position shown in FIG. 2. Cover 80 is then latched, as by latching members 81,82.

The telemetry chassis 40 and its components will now be described in further detail. Chassis 40 has two sections. The right section 51 is a four-sided compartment but the left section 41 has an open front which faces the secondary cavity 21b. Section 41 has a narrow floor 141 which leaves an opening 141a (FIG. 3) whose purpose will be described later.

Referring again to left section 41, as best seen in FIGS. 5 and 6, in a present best mode embodiment, left section 41 contains an elongated isothermal terminal block 42, three transmitters 43, fifteen thermocouple transition tubes 47, one internal thermocouple monitor 45, and a wire-transition antenna post 46. The three transmitters 43 may be held in place by clips 44. Preferably, for easy access, terminal block 42 is elevated above the floor of chassis 40, supported on a shelf which is part of the chassis. Terminal block 42 contains an isothermal material 142 (FIG. 3) which increases the heat dissipation from the thermocouple leads and thus provides additional heat insulation.

Figure 8:
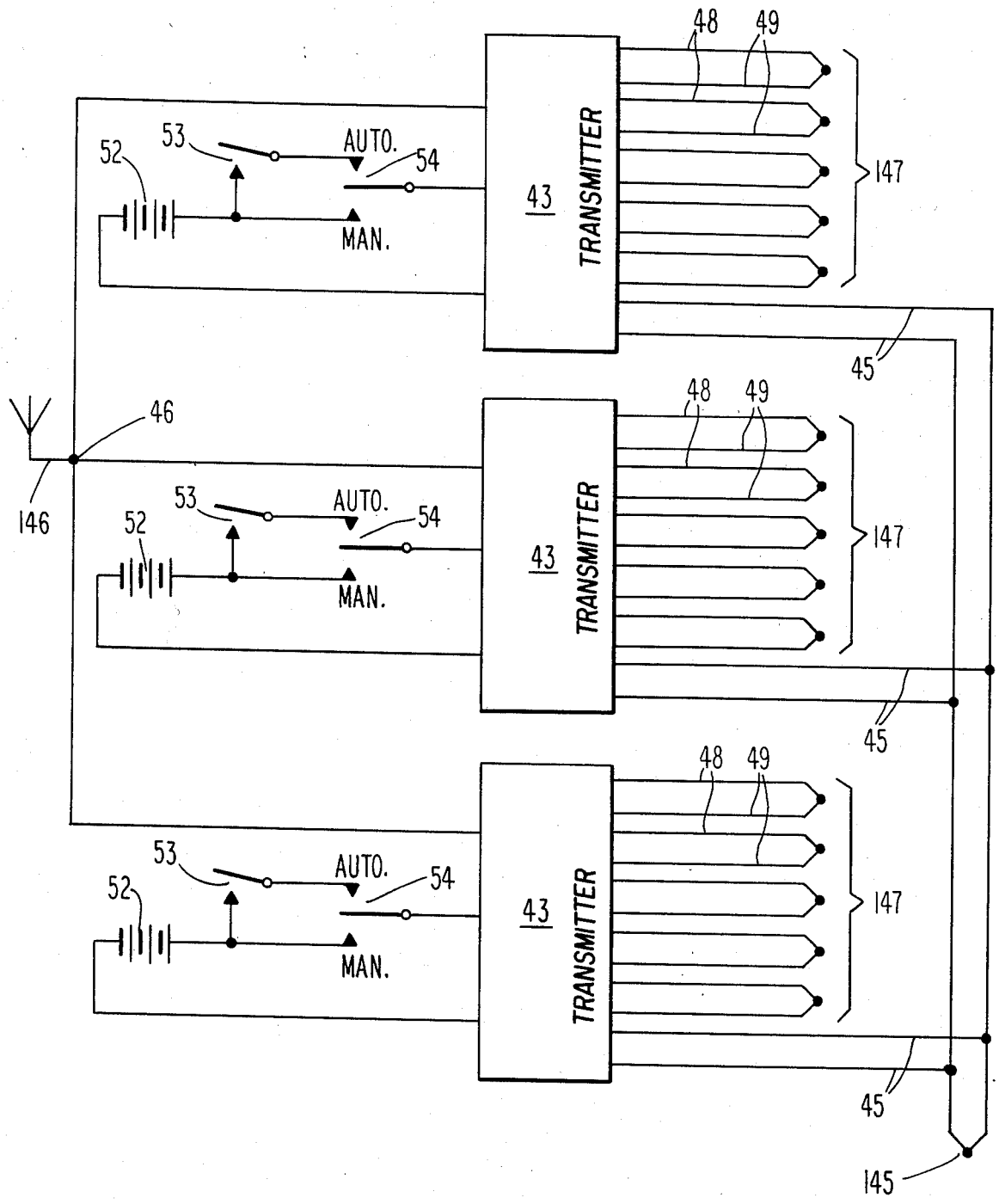
FIG. 8 is a circuit diagram illustrating circuitry employed to transmit temperature data generated by the thermocouples to the transmitting antenna.

Transmitters 43 may preferably be Acurex Model No. 219Q, which is a six-channel, T/C-transmitter, Type K. As illustrated in FIG. 8, five of the six input channels of each transmitter 43 receive temperature data from the hot junction tips 147 of five thermocouples, each of which is located outside of box 10 and each of which is attached to a different workpiece. In the specific example being described, each of the hot junction tips 147 of the five thermocouples, associated with one of the three transmitters, are attached to a different radiator positioned among the many radiators which are to be brazed in the vacuum furnace.

The sixth input channel or each transmitter is connected to an internal-box monitor thermocouple 45 whose junction tip 145 is located within the left section 41 of chassis 40. Thus, this junction tip is within steel box 10 and within heat-insulating box 20. The purpose and function of the internal-box monitor thermocouple 45 will be described later.

Transmission of data signals from each of the three transmitters 43 is accomplished by wire connections from each antenna-output of the transmitters 43 to an antenna wire-transition post 46 located within the chassis 40 and then out to antenna 146. Antenna 146 is preferably encased in ceramic tubing 148 once outside of steel box. Each of the three transmitters 43 operates on a different frequency. Each of the frequencies is preferably within the 88–108 megahertz band. Each transmitter 43 transmits within its own frequency the temperature data of six channels, using multiplexing techniques.

To summarize, three transmitters operating on three different frequencies transmit a total of eighteen temperature data signals to a single transmitting antenna 146 from fifteen thermocouple tips or junctions 147, each located on a different workpiece (radiator) located outside of telemetry box 10, and also from one thermocouple junction tip 145 located inside of telemetry box 10. Each transmitter 43 transmits six signals which are multiplexed on to a single frequency using multiplexing techniques. Five of the six signals carry data relating to the temperatures at the different workpieces. The sixth signal carries temperature data regarding the inside temperature at chassis 40, inside of telemetry box 10. The thermocouple monitor 45 which is used to measure the temperature within the chassis 40 may preferably be a Tudor Catalog No. 6001-K-S-A04-1-U-3-TT.

The thermocouples which are used to sense the temperature at the different workpieces (in the present example, radiators) are similar except for the length of the thermocouple leads. For example, five of the thermocouples may preferably be Tudor Catalog No. 6001-K-S-INC-1-U-250-TT; five may be Tudor Catalog No. 6001-K-S-INC-1-U150-TT; and five may be Tudor Catalog No. 6601-K-S-INC-1-U-50-TT. As is indicated by the catalog numbers, these thermocouples are identical except for the length of the leads, which in the first group is two hundred and fifty inches, in the second group one hundred and fifty inches, and in the third group fifty inches. This difference in length of thermocouple leads is necessary because some of the workpieces are positioned considerably farther from the telemetry box 10 than are other workpieces.

It may be helful at this point to describe what is meant by a thermocouple, as that term is used in this application. Different types of thermocouples are commercially available. All thermocouples are characterized by having two dissimilar metals which are joined together at the tip of the thermocouple. The type of thermocouple preferably used in the present application is Type K. In a Type K thermocouple, one of the dissimilar metals is Alumel; the other is Chromel. Extending from the junction of the dissimilar metals at the tip 147 of the thermocouple, an Alumel conductor in one form or another extends all the way back to the transmitter. Similarly, a Chromel conductor extends all the way back to the transmitter. There is no contact between the Alumel and the Chromel conductors except at the junction at the tip 147.

The conductors of dissimilar metal 48, 49 in a thermocouple lead are extremely fine, as fine as a strand of hair. These conductors are encased in metal tubing 57, preferably of Inconel, also known as Alloy 600. This is a nickel-base alloy containing approximately sixteen per cent chromium and approximately seven per cent iron, and characterized by marked resistance to aqueous corrosion and by resistance to high-temperature oxidation. Use of Inconel sheathing increases the system reliability and decreases the conduction of heat into the box 10. The dissimilar metal hairlike wires are insulated from each other by an oxide powder. Because the dissimilar wires which extend from the tip 147 of the thermocouple are so very fine, they are too fragile and too difficult to be handled manually. Thus, a thermocouple includes what is known as a transition tube 47 in which the very fine dissimilar wires 48, 49 are connected to larger wires 148, 149 (FIG. 3) of the same dissimilar types which extend from the output side of the transition tube 47.

As previously mentioned, in at least some prior art telemetry chassis installations in vacuum furnaces, the thermocouple wires which extend from the junction tip have been terminated in an electrical plug which is insertable into an electrical socket provided in the outer wall of the metal box which contains the telemetry chassis. Such an electrical plug would, of course, be exposed to the very high temperatures of the vacuum furnace, and the electrical signal which is developed at and transmitted from the thermocouple tip becomes degraded due to expansion and contraction of this plug. According to one feature of my present invention, the very fine dissimilar thermocouple wires 48, 49 encased in sheath 57, preferably of Inconel, extend from the thermocouple junction at the tip 147 through the front wall of outer box 10, through insulation block 20a of inner box 20 below guillotine insert 60, and terminate in transition tubes 47 which are located within the cavity 21 of block 20a. These transition tubes 47 are clearly seen in FIGS. 1, 2, 3 and 5 of the drawing. The larger wires 148, 149 of Alumel and Chromel, respectively, which extend from the output side of transition tube 47 are connected to spade lugs 248, 249 of Alumel and Chromel, respectively, (only 249 is visible in FIG. 3) which are connected to screws located on the input side of terminal block 42. Links 448, 449 (FIG. 5) of Alumel and Chromel respectively (only 449 is visible in FIG. 3) connect screws on the input side of terminal block 42 to screws on the output side. These links 448, 449 together with metal strip 142 (FIGS. 3 and 6) function as heat sinks. Spade lugs 648, 649 (only 649 is visible) and conductors 748, 749 of Alumel and Chromel complete the connections from the output side of the terminal strip to the transmitters 43.

It will be seen from the foregoing description that, beginning at the junction tip 147 of the thermocouple which is positioned on the workpiece, Alumel and Chromel conductors 48, 49 of very fine hairlike wire encased in Inconel tubing 57 extend from the junction tip 147 to the transition tube 47, then larger Alumel and Chromel conductors, including conductors 148, 149 spade lugs 248, 249 links 448, 449 spade lugs 648, 649 and conductors 748, 749 extend from the transition tube to the transmitter 43. It will be noted that no terminations of thermocouple conductors are exposed to the furnace heat. This maximizes the reliability of the signals generated, transmitted and received.

As previously stated, each pair of very fine hairlike wires 48, 49 of dissimilar metal, in the present case Alumel and Chromel, which extend from the thermocouple tip 147 to transition tubes 47 is embedded in an oxide powder and encased in a tube 57 preferably made of Inconel. Secured, as by welding, to the outer wall of the stainless steel outer box 10 are a series of fifteen strain-relief compression fittings 56 through each of which one of the Inconel tubings 57 pass. The compression fitting 56 includes an inner ferrule (not shown) and a nut 156 which, when tightened, causes the ferrule to compress or crimp the tubing 57. Thus, any external pulling force or outward strain which may be exerted on the thermocouple-conductor tubing 57 outside of telemetry box 10 terminates at compression fitting 56 and the strain does not pass through to transition tube 47.

The links 448, 449 of Alumel and Chromel, respectively, which interconnect the spade lugs 248, 249 on the input side of terminal block 42 with spade lugs 648, 649 on the output side, are relatively large in volume in comparison with the other Alumel and Chromel conductors. Thus, the links 448, 449 which touch metal strip 142 function as heat-sinks and contribute to preventing heat which is drawn into box 10 through the thermocouples from the vacuum furnace from passing inwardly all the way to the transmitters 43. Transmitters 43 are heat-sensitive and must be protected against heat.

Additional protection against transfer of heat between conductors 748, 749 and transmitters 43 is provided by using an aluminum harness 140 (FIGS. 2 and 3) to support individual conductors. Conductors 748 and 749 transfer heat to the aluminum harness 140 and to the aluminum sidewall of chassis 40 as they pass through harness 140.

Additional protection to reduce or prevent the passage of heat from the vacuum furnace to the telemetry chassis is provided by increasing the length of the Inconel tubing 57 which is in engagement with guillotine door 60 and block 20a, both being of heat-insulating material. This is accomplished by using an inclined floor 25 to provide an inclined path for supporting the tubing 57 between the front wall of the outer steel box 10 and the transition tubes 47 within section 41 of the chassis 40. Grooves (not shown) may preferably be provided in inclined floor 25 of cavity 21b and the Inconel tubing 57 may be placed in such grooves. By providing a path of increased length between the compression fitting 56 and the transition tubes, additional transfer of heat occurs from the Inconel tubing into the Carborundum Fiberfrax Duraboard "HD" material of door 60 and block 20a.

In section 41 of telemetry chassis 40, leads (not shown) extend from each of the three transmitters 43 to a wire-transition antenna post 46. Conductor 146 extends from antenna post 46 through the front wall of outer box 10 to a transmitting antenna 146. Outside of box 10, conductor 146 is preferably encased in ceramic tubing 148 which insulates the antenna from signal loss and also prevents possible shorting of the transmission antenna to box 10. A receiving antenna (not shown) is mounted on an interior wall of the preheat and braze chambers of the vacuum furnace and as the platform carrier which bears the workpieces (radiators) and the telemetry box 10, is transported through the chambers of the furnace, the data of transmitting antenna 148 is received by the receiving antenna, the distance between the two being relatively small. Leads extend from the receiving antenna through the furnace wall to a receiver (not shown) located outside of the furnace and then to a computer which, in response to signals received, makes adjustments, if necessary, to various heating elements of the furnace, the purpose being to achieve uniform brazing of the workpieces.

As illustrated in FIG. 8 and as previously described, each of the three transmitters 43 is provided with six input channels of which five carry input signals developed by the thermocouple junctions 147 located at the tips of the thermocouples, each tip being connected to a different workpiece or radiator. The sixth channel of each of the three transmitters 43 receives a signal developed by the junction tip 145 of the thermocouple monitor 45 which is positioned within section 41 of the telemetry chassis. Stated another way, the temperature sensed by the junction tip 145 of thermocouple 45 is fed to the sixth channel of each of the three transmitters. Thus, the input signals on the sixth input channel of each of the three transmitters 43 should deliver the same output signals to the transmitting antenna 148. Such received signals, if not identical or at least closely similar, provide an indication to the computer operator that at least one of the transmitters requires recalibration. Thus, thermocouple 45 monitors the chassis temperature while providing an accurate cross-reference between the transmitters. Calibration is accomplished by removing covers 80 and 70 to expose toggle switch 54 and manually throwing toggle switch 54 from Automatic to the Manual position (FIG. 8). It will be seen that toggle switch 54 provides the capability of selecting either Automatic, OFF, or Manual control of transmitters 43. Automatic control is discussed later.

The design and construction of the telemetry box of the present application is such as to provide easy access to the telemetry chassis 40 for maintenance and repair, and also for replacement of thermocouples. To gain access to the interior of the telemetry box, cover 80 of outside box 10 is, of course, first unlatched and removed, and then top plate or cover 70 of inner box 20 is removed. It is to be noted that to gain access to the telemetry chassis it is only necessary to remove covers 80 and 70, and that it is not necessary to remove the guillotine insert 60. Insert 60 need only be removed when access to the secondary cavity 21b is necessary, as when one or more of the thermocouples are to be removed and replaced. Replacement of such component parts as batteries 52 and pressure switches 53 may be accomplished without removal of the guillotine insert 60.

Chassis 40 can be lifted from the primary cavity 21a without removal of guillotine insert 60 so as to perform transmitter maintenance. This is done by disconnecting the terminal screws and the spade lugs 248, 249 on the input side of terminal block 42. The spade lugs and connected wires 148, 149 are then bent upwardly close to the transition tubes 47. Then, as seen in FIG. 3, when chassis 40 is lifted upwardly, the spade lugs, wires and transition tubes 47 will pass through the opening 141a in the floor 141 of the chassis.

As described earlier in this application, the present invention is directed particularly, but not exclusively, to a system wherein a carrier, carrying workpieces and a telemetry chassis, is transported by a conveyor from a loading station over an entrance bridge through a front door of a preheat chamber, then into a braze chamber where the workpieces are brazed, then into an exit chamber, then onto an exit bridge which is outside of the vacuum furnace, then into a cooling chamber, and finally to an unloading station. Unless provision is made for turning OFF the batteries 52 (which are used to energize the transmitters 43) during those periods when no data is being transmitted and turning ON the batteries only when data is being transmitted, the batteries would be ON throughout the entire cycle. For example, in a specific installation which is being described in this application, the entire cycle takes about ninety minutes, but the portion of the cycle during which the workpieces and telemetry chassis are in the pre-heat and braze chambers and signals are being transmitted by the transmitters is only about thirty-five minutes. Thus, in the absence of the present invention, the batteries would be ON unnecessarily for a total of fifty-five minutes, thereby reducing substantiallly the life of the batteries.

In accordance with the present invention, which switch 54 is set to AUTO (FIG. 8), three unique pressure switches 53 control the ON-OFF time of their respective transmitters 43. A diagrammatic illustration of such a pressure switch is shown in FIG. 7. The pressure switches 53 shown in FIG. 8 are normally open. They are not intended to close until the pressure at chassis 40 within telemetry box 10 reaches a very low vacuum corresponding to that of the vacuum furnace. The pressure at which the contacts of the pressure switches 53 close may, for example, be $-17''$ of mercury-vacuum. The contacts of switches 53 then remain closed until the pressure rises, for example, to $-13''$ of mercury-vacuum. Thus, pressure switches 53 are closed, and the energy of batteries 52 is being utilized, for only a fraction of the entire cycle time of the brazing procedure.

As illustrated in FIG. 7, each of vacuum switches 53 may, for example, comprise a housing 91 which is open to atmosphere through holes 93. Contained within housing 91 is a bellows 90 which is sealed as by plug 94. Before sealing, bellows 90 is pumped down, for example, to $-17°$ of mercury. The sealed bellows 90 is then placed in the housing 91 of the pressure switch 53. Due to openings 93 the pressure in switch 53 outside of bellows 90 is atmosphere. When switch 53 is subjected to a reduced pressure, such as occurs in the pre-heat chamber, the pressure within the switch but outside of the bellows, drops and the bellows 90 begins to expand. As the expansion of bellows 90 continues, a point is reached where expansion of the bellows causes the contacts of micro-switch 92 to close, thereby completing the circuit to the batteries 52. In a typical case, the contacts of the micro-switch 92 may be set to close at $-17''$ of mercury-vacuum and to stay closed all the way down to $1 \times 10^{-5}$ torr. The contacts will open when the pressure in pressure switch 53 rises to $-13''$ of mercury-vacuum and the contacts will stay open at all pressures more positive than $-13°$ of mercury-vacuum. It is estimated that the provision of pressure switches 53 will extend the life of the batteries 52 approximately five times.

The construction of heat-insulating boxes 10 and 20 and of the various components are such that, despite sixteen penetrations through the front wall of outer box 10, the boxes 10 and 20 are capable of holding the temperature at the telemetry chassis 40 in primary cavity 21a substantially constant at about 70° F. while the exterior of the box 10 is exposed to the temperatures of the vacuum furnace. The temperatures in the vacuum furnace may, for example, have a temperature profile as follows: a ramp increase in temperature at 40° per minute for twenty minutes from 200° F. to 1000° F., then holding at 1000° F. for twenty minutes, then a ramp increase in temperature at 100° F. per minute for five minutes from 1000° F. to 1500° F., then holding at 1500° F. for twenty minutes, then a static vacuum cool from 1500° F. to 800° F. in 2½ hours.

It is to be noted that the construction of the heat-insulating boxes and contents are such that there is no metal between the inside and outside of the box except for the antenna and thermocouple leads which are encased in ceramic and Inconel tubing, respectively.

I claim:

1. A heat-insulating container for housing a telemetry system for use in a high-vacuum furnace, said container comprising:
   a. an outer metal box;
   b. an inner box comprising a block of heat-insulating material within said outer box, the length and width of said block corresponding to that of said outer box, the height of said block being less than that of said outer box;
   c. a primary cavity in said block;
   d. a secondary cavity adjacent said primary cavity, said secondary cavity having a floor which slopes downwardly toward a front wall of said outer box;
   e. a telemetry chassis and component parts in said primary cavity, said parts including batteries, transmitters, pressure switches, thermocouple elements including transition tubes, an isothermal double-layer terminal strip having input and output sides, and conductive interconnecting means, including means connecting said thermocouple elements to said transmitters and means connecting said transmitters to said batteries through said pressure switches;
   f. an insert of heat-insulating material slidably and removably fitted into said secondary cavity, said insert having an inclined bottom having a slope corresponding to that of said slope of said floor of said primary cavity;
   g. a removable top plate of heat-insulating material having a depending portion removably fitted into an upper portion of said primary cavity; and
   h. a metal cover for said container;
   i. said pressure switches being normally open and adapted to close when pressure within said primary cavity falls to a pre-selected sub-atmospheric pressure, thereby to complete the battery connection to a transmitter.

2. Apparatus according to claim 1 wherein said outer metal box is stainless steel.

3. Apparatus according to claim 1 wherein thermocouple conductors of dissimilar metals are supported on said sloping floor of said secondary cavity.

4. Apparatus according to claim 1 wherein said thermocouple conductors are sheathed in a nickel-base alloy containing approximately sixteen per cent chromium and approximately seven per cent iron.

5. Apparatus according to claim 1 wherein said secondary cavity has a vertical groove at each end and wherein said slidable insert has a projecting tongue at each end.

6. Apparatus according to claim 1 wherein metal plates and links of dissimilar metal corresponding to those of said thermocouple conductors interconnect said input and ouput sides of said isothermal double-layer terminal strip, the volume of said links and plates being sufficiently large, relative to said thermocouple conductors, to function as heat sinks.

7. Apparatus according to claim 1 wherein a thermocouple is provided entirely within said primary cavity for monitoring the cavity temperature and for use in calibrating the transmitters, and means are provided for connecting said monitoring thermocouple to each of said transmitters.

8. Apparatus according to claim 1 wherein each pressure switch includes an open-to-atmosphere housing, a sealed bellows within said housing, said bellows having a sub-atmospheric internal pressure, and electrical contacts within said housing positioned to be closed in response to expansion of said bellows for completing the battery connection to a transmitter.

9. A heat-insulating container for housing a telemetry chassis intended for use within a high-temperature vacuum furnace for transmitting temperature data to a receiving station external of the furnace, said container including:
   a. a block of material having heat-insulated properties having therein a primary cavity and an adjacent secondary cavity;
   b. a door insert slidable into and out of said secondary cavity;
   c. a cover insulating material for said primary cavity;
   d. a telemetry chassis within said primary cavity, said telemetry chassis including transmitters, batteries, thermocouple elements including transition tubes, and interconnecting conductors;
   e. said thermocouple elements including pairs of fine diameter dissimilar metal conductors extending from said thermocouple transition tubes within said primary cavity through said block to thermocouple junction tips of dissimilar metals outside of said block and outside of said container;
   f. said thermocouple elements also including pairs of dissimilar metal conductors of larger diameter than that of said fine conductors, said larger diameter conductors being located within said primary cavity and extending from said transition tubes to said transmitters;
   g. said interconnecting conductors including means connecting said batteries to said transmitters.

10. Apparatus according to claim 9 wherein said secondary cavity has an inclined floor which inclines downwardly, wherein thermocouple conductors are supported on said inclined floor, and wherein said slidable door insert has a correspondingly inclined bottom surface.

11. Apparatus according to claim 9 wherein said telemetry chassis includes a terminal block having an input side and an output side and wherein dissimilar metal thermocouple conductors are connected to said input side and also to said output side of said terminal block, and wherein dissimilar metal heat sinks interconnect said input and output sides of said terminal block.

12. Apparatus according to claim 9 wherein dissimilar metal thermocouple conductors extending from said transition tubes to thermocouple junction tips are embedded in an insulating powder encased in tubing.

13. Apparatus according to claim 9 wherein a thermocouple monitor is positioned entirely within said primary cavity for monitoring the temperature of said primary cavity, and means are provided connecting said monitoring thermocouple to each of a plurality of transmitters.

14. Apparatus according to claim 13 wherein temperature data signals generated by said thermocouple monitor within said primary cavity are transmitted by each of said plurality of transmitters and compared for calibration of said transmitters.

15. A heat-insulating container for housing a telemetry chassis intended for use within a high-temperature vacuum furnace for transmitting temperature data to a receiving station external of the furnace, said container including:
   a. a block of material having heat-insulating properties having a cavity therein;
   b. a cover of insulating material for said cavity;
   c. a telemetry chassis and components within said cavity, said components including batteries, transmitters, pressure switches, and thermocouple elements;
   d. said thermocouple elements being connected to said transmitters and including transition tubes and pairs of fine dissimilar metal conductors extending from said transition tubes within said cavity through said block to thermocouple junction tips of dissimilar metals outside of said block and outside of said container; and
   e. said pressure switches being connected between said batteries and said transmitters, said pressure switches being normally open and connected to maintain said transmitters normally in inoperative state, said pressure switches being adapted to close in response to the pressure in said cavity falling to a preselected low value and to open in response to said pressure rising to a preselected value.

16. Apparatus according to claim 15 wherein each of said pressure switches includes an open-to-atmosphere housing containing a sealed bellows having a low inner pressure, and a switch within said housing positioned to be actuated when said bellows expands in response to lowering of pressure within said housing but outside of said bellows.

* * * * *